(No Model.)

W. P. VICKERY.
CAR STARTER.

No. 330,946. Patented Nov. 24, 1885.

WITNESSES:
Chas. H. Kimball.
W. H. Purinton

INVENTOR:
William P. Vickery
Per atty,
William Henry Clifford

UNITED STATES PATENT OFFICE.

WILLIAM P. VICKERY, OF EAST AUBURN, MAINE.

CAR-STARTER.

SPECIFICATION forming part of Letters Patent No. 330,946, dated November 24, 1885.

Application filed September 23, 1885. Serial No. 177,953. (No model.)

*To all whom it may concern:*

Be it known that I, WILLIAM P. VICKERY, of East Auburn, in the county of Androscoggin and State of Maine, have invented certain new and useful Improvements in Car-Starters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
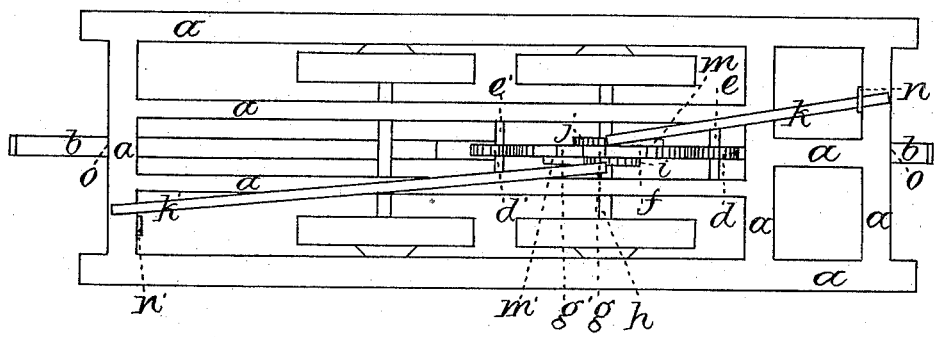
Figure 2:
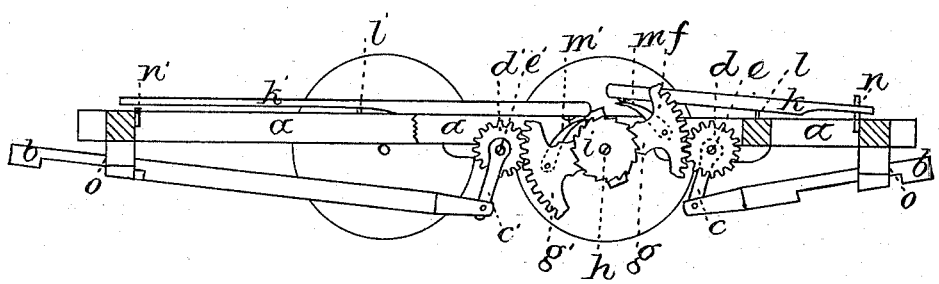

Figure 1 is a top plan. Fig. 2 is a side elevation.

Same letters show like parts.

My invention relates to horse-car starters.

$a$ is the truck-frame. $b$ is the pole. The pole $b$ is connected by a pivot with the cranks $c\ c'$. These cranks $c\ c'$ are rigidly connected with gears $d\ d'$, set rigidly on the shafts $e\ e'$. These gears $d\ d'$ mesh with segment-gears $f$ and $g'$ on the arm $g$. The arm $g$ is loosely hung on the shaft $h$, which is the shaft of one pair of the wheels of the car. At the opposite end of the arm $g$ is the other segment-gear, $g'$. On the shaft $h$ are set two gears, $i\ j$. Over these two gears are set two horizontal arms, $k\ k'$, pivoted at $l\ l'$. The arms $k\ k'$ are employed to lift the pawls $m\ m'$ out of the teeth of the gears $i\ j$, and drop them into the teeth when required.

When the pawls $m$ or $m'$ are to be lifted out of the teeth of the gears $i\ j$, the outer ends of the arms $k$ or $k'$ are passed under the catches $n$ or $n'$. The poles $b$ slip through the holes $o$. When pushed back, they leave the cranks $c$ or $c'$, as illustrated by $c$. When drawn forward, the cranks $c$ or $c'$ are in the position illustrated by $c'$.

When the pole is drawn forward by the animals in starting, one of the gears $d$ or $d'$ is partially revolved by the crank $c$ or $c'$. This throws downward the segment-gear $f$ or $g'$. The segment-gear on the other end of the arm $g$, which is thus thrown up, is of course thrown up. This upward movement of such gear on such opposite end of the arm $g$ causes a partial revolution of one of the gears $i$ or $j$, thus causing the car-wheels on the shaft $h$ to turn also. This is effected by the fact that the pawls $m$ and $m'$ are pivoted, one to one end and the other to the other end of the arm $g$. Thus an initial movement is given to the shaft $h$ and its wheels which aids very essentially in the ease of starting the car and relieves the animals from that strain and exertion they would otherwise have to undergo.

Poles and the other devices are arranged at each end of a car.

What I claim as my invention, and desire to secure by Letters Patent of the United States, is—

The combination, with the wheel-shaft of a horse-car, of the pole $b$, cranks $c\ c'$, gears $i\ j$, segment-gears $f\ g'$, arm $g$, arms $k\ k'$, and pawls $m\ m'$, as herein set forth.

In testimony that I claim the foregoing as my own I have hereunto affixed my signature in presence of two witnesses.

WILLIAM P. VICKERY.

Witnesses:
FRANK W. DANA,
WILLARD F. ESTEY.